United States Patent [19]

Mack et al.

[11] Patent Number: 4,792,901
[45] Date of Patent: Dec. 20, 1988

[54] METHOD FOR CONTROLLING AMT SYSTEM INCLUDING AFTER TRANSMISSION GEAR CHANGE FUEL CONTROL

[75] Inventors: William J. Mack, Warren; Robert R. Smyth, Bloomfield Hills, both of Mich.

[73] Assignee: Eaton Corporation, Cleveland, Ohio

[21] Appl. No.: 863,651

[22] Filed: May 15, 1986

[51] Int. Cl.$^4$ .................................................. B60K 41/00
[52] U.S. Cl. ..................................... 364/424.1; 74/866
[58] Field of Search ............... 364/424.1; 74/866, 867, 74/868, 870, 869, 871

[56] References Cited

U.S. PATENT DOCUMENTS

| | | | |
|---|---|---|---|
| 3,478,851 | 11/1969 | Smyth et al. | 192/3.55 |
| 4,081,065 | 3/1978 | Smyth et al. | 192/0.076 |
| 4,220,058 | 9/1980 | Petzold | 74/866 |
| 4,361,060 | 11/1982 | Smyth | 74/866 |
| 4,432,445 | 2/1984 | Windsor | 192/0.076 |
| 4,474,081 | 10/1984 | Kinngasa et al. | 74/866 |
| 4,493,228 | 1/1985 | Vukovich et al. | 74/866 |
| 4,527,447 | 7/1985 | Richards | 74/866 |
| 4,551,802 | 11/1985 | Smyth | 364/424.1 |
| 4,558,772 | 12/1985 | Grimes et al. | 192/0.076 |
| 4,576,263 | 3/1986 | Lane et al. | 192/0.044 |
| 4,595,986 | 6/1986 | Daubenspeck et al. | 364/424.1 |

Primary Examiner—Parshotam S. Lall
Assistant Examiner—V. N. Trans
Attorney, Agent, or Firm—H. D. Gordon

[57] ABSTRACT

A method for controlling an AMT system (10) is provided including sensing the recovery mode of operation of the fuel control (26) and, if the fuel control command out signal (THCMD) from the controller (42) is less than the demand input signal (THL), increasing the value of the fuel control command output signal (THCMD) until it is equal to the value of the throttle pedal demand input signal (THL) at a rate dependent upon currently engaged gear ratio (GR) from an initial value dependent upon engine speed (N).

17 Claims, 3 Drawing Sheets

METHOD FOR CONTROLLING AMT SYSTEM INCLUDING AFTER TRANSMISSION GEAR CHANGE FUEL CONTROL

BACKGROUND OF THE INVENTION

1. Field of the Invention

This invention relates to vehicle automatic and semi-automatic power transmission systems providing a pluraiity of gear reduction ratios, such as automatic mechanical transmissions (i.e. "AMTs"), and, to control systems and methods therefor. In particular, the present invention relates to control systems and methods for automatic mechanical transmission systems wherein gear selection and shift decisions are made and/or executed based upon measured and/or calculated parameters such as vehicle or transmission output shaft speed, transmissoon input shaft speed, engine speed, throttle position, rate of change of throttle position, rate of change of vehicle and/or engine speed and the like. More particularly, the present invention relates to a method for controlling an AMT system after completion of a transmission gear change operation including controlling the rate and manner of returning control of the fuel supply to the engine to the vehicle operator.

2. Description of the Prior Art

The use of automatic transmissions of both the automatic mechanical type utilizing positive clutches and of the planetary gear type utilizing frictional clutches is well known in the prior art as are control systems therefor. Electronic control systems utilizing discrete logic circuits and/or software controlled microprocessors for automatic transmissions wherein gear selection and shift decisions are made based upon certain measured and/or calculated parameters such as vehicle speed (or transmission output shaft seeed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are nnown in the prior art. Examples of such automatic/semiautomatic transmission control systems for vehicles may be seen by reference to U.S. Pat. Nos. 4,361,060; 4,551,802; 4,527,447; 4,493,228; 4,425,620; 4,463,427; 4,081,065; 4,073,203; 4,253,348; 4,038,889; 4,226,295; 3,776,048, 4,208,929; 4,039,061; 3,974,720; 3,478,851 and 3,942,393, the disclosures of which are all hereby incorporated by reference.

Automatic control systems/subsystems for automatically controlling the engagement and disengagement of AMT system vehicle master clutches are known in the prior art as may be seen by reference to U.S. Pat. Nos. 4,081,065; 4,401,200; 4,413,714; 4,432,445, 4,509,625 and 4,576,263, the disclosures of all of which are hereby incorporated by reference. One control system for adjusting fuel control in view of throttle setting is, by way of example only, illustrated in U.S. Pat. No. 4,493,228, the disclosure of which is hereby incorporated by reference.

While the above referenced automatic/semi-automatic transmission control systems are effective to control the supply of fuel to the engine under most coniitions, under certain conditions, if fuel is allowed to be supplied to the engine in accordance with throttle pedal setting and/or if allowing operator control of the supply of fuel to the engine after a shift is not accomplished as rapidly as possible without causing driveline jolts, the control of the engine may be objectionably sluggish and/or may not provide acceptably smooth vehicle operation.

SUMMARY OF THE INVENTION

In accordance with the present invention, the drawbacks of the prior art have been overcome or minimized by providing a control system, preferably an electronic control system, and control method, for automatic/semi-automatic mechanical transmission systems wherein throttle setting decisions are made and/or executed based upon measured and/or calculated parameters including at least input signals indicative of throttle position, last throttle setting, engine speed and currently engaged gear ratio. Other inputs/parameters, such as signals indicative of transmission input shaft speed, transmission output shaft speed, rate of change of throttle position, condition of the master clutch, operation of the vehicle brakes, and the like are also utilized to make decisions for control of the AMT system.

The predetermined logic rules or programs by which the various input signals are processed include a method for detecting completion of a transmission gear change operation, the current throttle pedal setting, the current commanded throttle setting and for calculating a minimum allowbble initial throttle setting value, such as the throttle setting necessary to maintain current engine speed under no load conditions.

The throttle setting is compared to the throttle pedal position. If throttle setting is equal to or greater than throttle pedal position, throttle setting is set equal to throttle pedal position.

If throttle pedal position is greater than throttle setting, throttle setting is first set equal to the lesser of the minimum allowable throttle setting value or throttle position and, thereafter, until throttle setting equals throttle pedal position, throttle setting is set equal to the lesser of throttle pedal position or the value of the sum of a constant related to currently engaged gear ratio added to the product of the last throttle setting multiplied by a constant greater than one. The control of fuel will remain in this mode until the throttle setting equals the throttle pedal position or until a different mode of fuel control is required due to initiation of a gear shift, or the like.

Accordingly, it is an object of the present invention to provide a new and improved control method for automatic mechanical transmission systems which involves sensing and identifying a rtturn of engine fuel control to the operator and controlling the rate and manner of allowing the throttle setting command output signal to equal the throttle pedal position input signal.

DESCRIPTION OF THE PREFERRED EMBODIMENT

Figure 1:
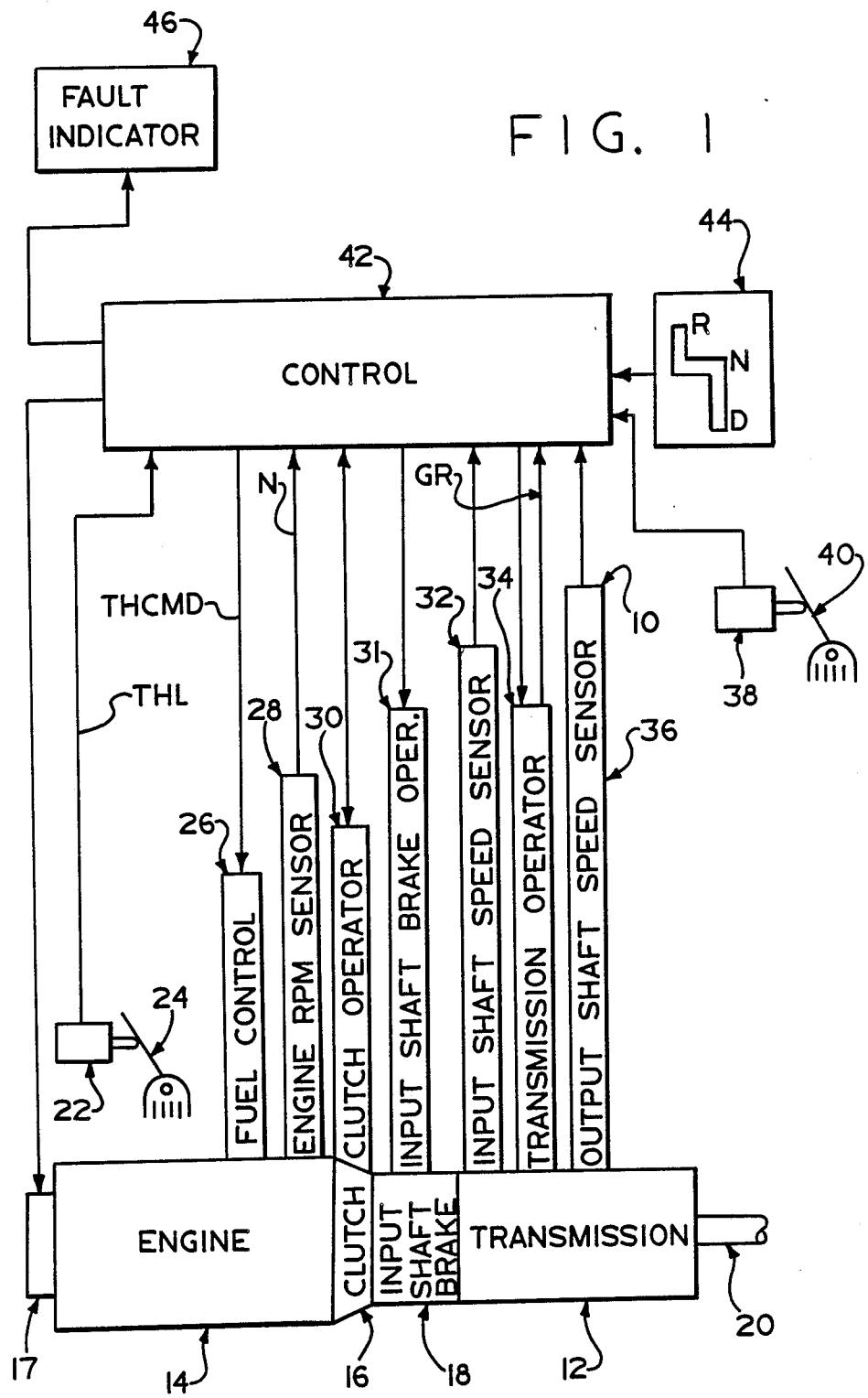
FIG. 1 is a schematic illustration of the components and interconnections of the automatic mechanical transmission control system of the present iinvention.
Figure 2A:
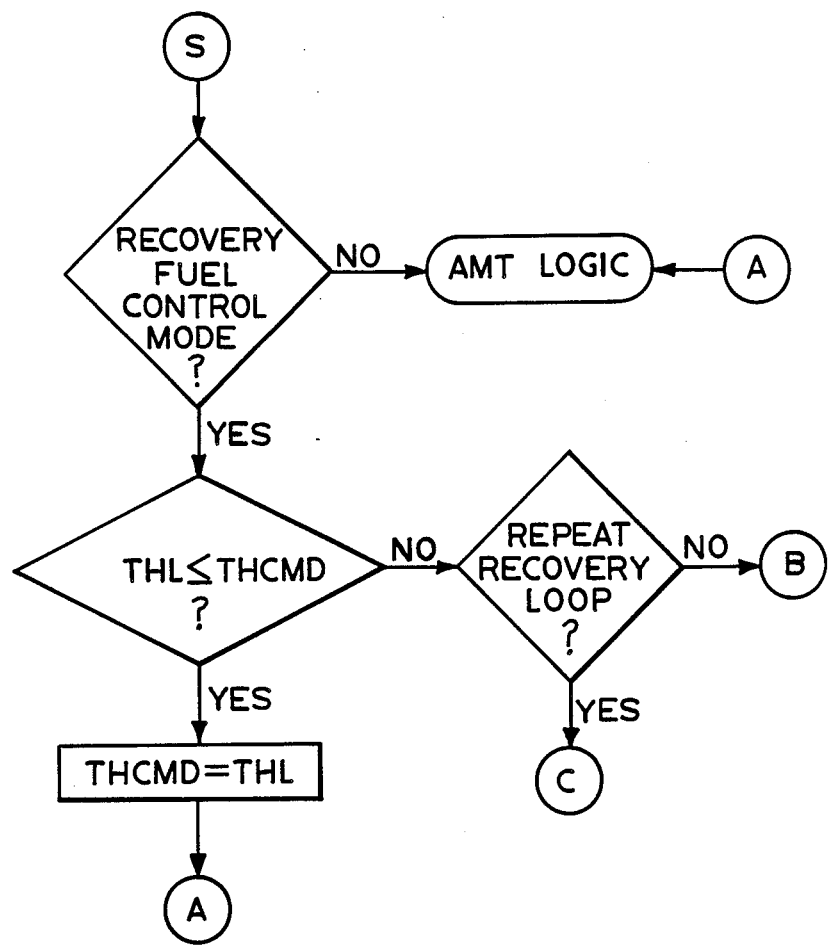
FIGS. 2A-2B are symbolic illustrations, in the form of a flow chart, illustrating the preferred manner of practicing the method of the present invention.
Figure 2B:
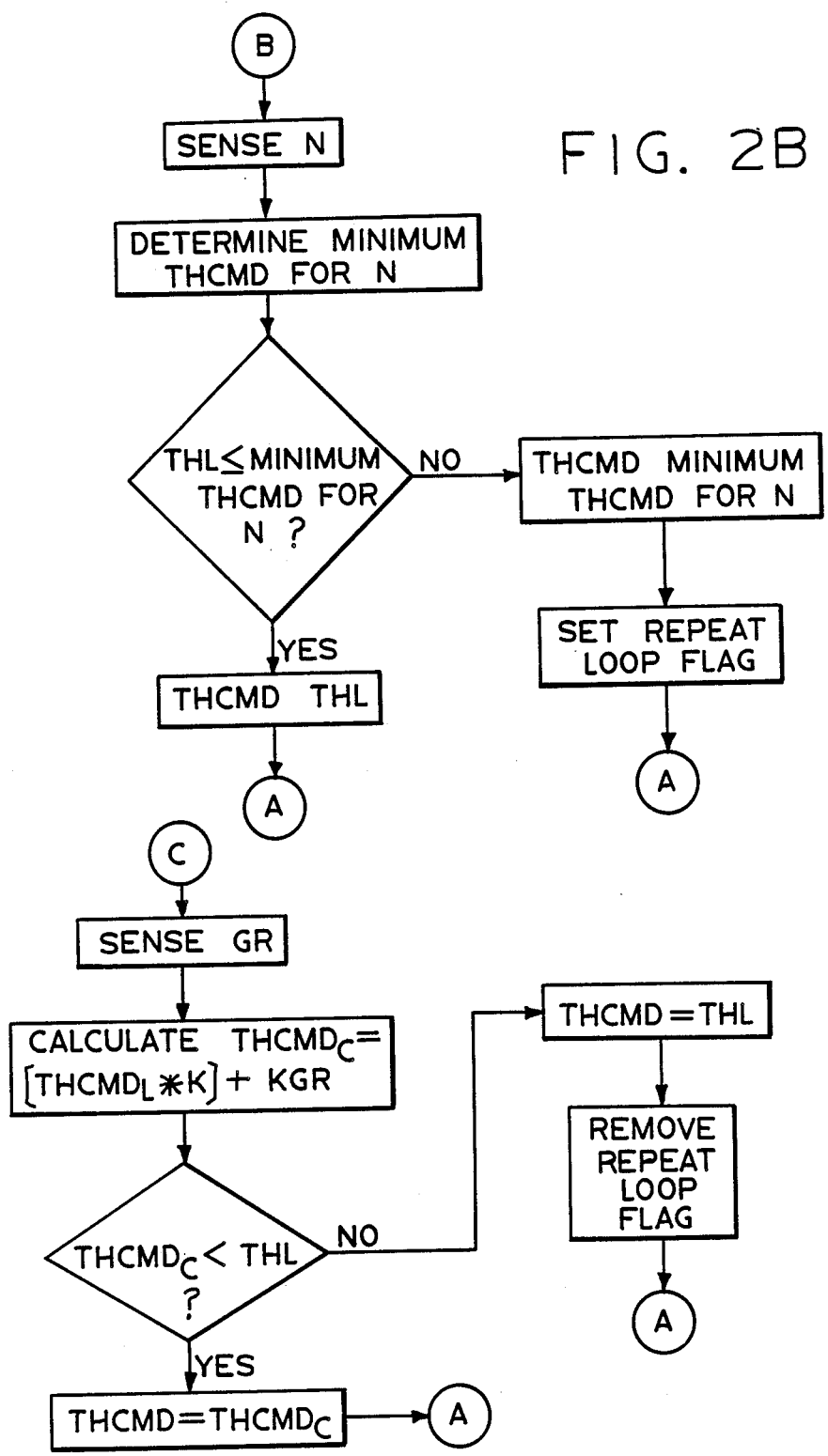

FIG. 1 schematically illustrates an automatic mechanical transmission system 10 including an automatic multi-speed coppound change gear transmission 12 driven by a throttle controlled engine 14, such as a well known diesel engine, through a master clutch 16. An engine brake, such as an exhaust brake 17 for retarding the rotational speed of engine 14 and/or an input shaft brake 18 which is effective to apply a retarding force to the input shaft upon disengagement of master clutch 16 may be provided as is known in the prior art. The output of automatic transmission 12 is output shaft 20 which is adopted for driving connection to an appropriate vehicle component such as the differential of a drive axle, a transfer case or the like as is well known in the prior art.

The above mentioned power train components are acted upon and monitored by several devices, each of which will be discussed in greater detail below. These devices include a throttle position or throttle opening monitor assembly 22 which senses the position of the operator controlled vehicee throttle or other fuel throttling device 24, a fuel control device 26 for controlling the amount of fuel to be supplied to engine 14, an engine speed sensor 28 which senses the rotational speed of the engine, a clutch operator 30 which engages and disengages clutch 16 and which also supplies information as to the status of the clutch, an input brake operator 31, a transmission input shaft speed sensor 32, a transmission operator 34 which is effective to shift the transmission 12 into a selected gear ratio and to provide a signal indicative of current transmission status, and a transmission output shaft speed sensor 36. A vehicle brake monitor 38 senses actuation of vehicle brake pedal 40. Alternatively, the engaged gear ratio of transmission 11 may be calculated by comparing the input shaft speed signal to the output shaft speed signal.

The above mentioned devices supply information to and/or accept commands from a central processing unit or control 42. The central processing unit 42 may include analogue and/or digital electronic calculation and logic circuitry, the specific configuration and structure of which forms no part of the present invention. The central processing unit 42 also receives information from a shift control assembly 44 by which the vehicle operator may select a reverse (R), neutral (N), or forward drive (D) mode of operation of the vehicle. An electrical power source (not shown) and/or source of pressurized fluid (not shown) provides electrical and/or pneumatic power to the various sensing, operating and/or processing units. A fault indicator or alarm 46 may display the identity of a specific fault or simply signal the existence of an unidentified fault. Drive train components and controls therefor of the type described above are known in the prior art and may be appreciated in greater detail by reference to above-mentioned U.S. Pat. Nos. 4,361,060; 3,776,048; 4,038,889 and 4,226,295.

Sensors 22, 28, 32, 36, 38 and 44 may be of any known type or construction for generating analogue or digital signals proportional to the parameter monitored thereby. Similarly, operators 17, 31, 26, 30 and 34 may be of any known electrical, pneumatic or eelectropneumatic type for executing operations in response to command signals from processing unit 42. Fuel control 26 will normally supply fuel to engine 14 in accordance with the operator's setting of throttle 24 but may, to synchronize the transmission during an up or down shift or to provide a smooth start from stop operation, supply a lesser (fuel dip) or greater (fuel boost) amount of fuel in accordance with commands from control unit 42. If, at completion of a fuel dip or fuel boost operation, the setting "THCMD" of the fuel control 26 differs from the setting of "THL" throttle pedal 24, the fuel control will operate in the "recovery mode", to be described in greater detail below, and the comand output signal "THCMD" will be ramped up or down, as appropriate, to match the throttle setting. One control system for adjusting fuel control in view of throttle setting is, by way of example only, illustrated in U.S. Pat. No. 4,493,228, the disclosure of which is hereby incorporated by reference.

The purpose of the central processing unit 42 is to select, in accordance with a program (i.e. predetermined logic rules) and current or stored parameters, the optimal gear ratio at which the transmission should be operating and, if necessary, to command a gear change, or shift, into the selected optimal gear ratio based upon the current and/or stored information.

The various functions to be performed by central processing unit 42, and a preferred manner of performing same may be seen in greater detail by reference to allowed pending U.S. patent application, Ser. No. 659,114 filed Oct. 10, 1984, now U.S. Pat. No. 4,595,986 and to published Society of Automotive Engineers SAE Paper No. 831776 published Nov. 1983, the disclosures of which are hereby incorporated by reference.

Although a fully automatic AMT system 10 is illustrated, the present invention is also applicable to semi-automatic AMT systems where the system automatically executes driver selected gear changes.

The recovery mode of fuel control 26 operation is a transition mode used to pass from one of the modes herein the CPU 42 controls the engine fuel supply regardless of the amount of fuel requested by the operator, as would occur during a synchronization operation, to the follow mode wherein fuel control is returned to the operator, i.e. the THCMD command output signal is equal to the THL pedal posttion input.

Both the THCMD throttle setting command output signal and the THL throttle pedal position input signal have values which may be considered as ranging from zero percent (0%) which corresponds to the amount of fuel required to maintain the engine 14 at idle speed under no-load conditions (i.e. clutch 16 disenggged and/or transmission 12 in neutral) to one hundred percent (100%) corresponding to maximum or wide open supply of fuel to the engine.

In the recovery mode of fuel control, the control of the supply of fuel to the engine is returned to the vehicle operator as quickly as possible to provide acceptable vehicle performance, while minimizing or eliminating unwanted driveline jerk and/or vehicle surge.

In the recovery mode of fuel control, if the throttle demand signal THL is less than the current throttle command output signal THCMD (as would be typical on a braking or coasting downshift) the throttle command output signal THCM is set to equal the demand input signal THL and the recovery mode sequence is completed.

If the throttle demand signal THL exceeds the current fuel control command output signal THCMD (as is typical after an upshift or after a power downshift), the THCMD is first set to a calculated minimum value which is a function of current engine speed N. Preferably, this minimum value is about the magnitude of the THCMD signal required to maintain the engine 14 at current speed N under no-load conditions and is thus a safe value to begin to smoothly ramp THCMD up to THL without the necessity of starting at a zero or minimum fuel control setting.

In subsequent loops, until the command output signal THCMD equals the demand input signal THL, which signals the completion of the recovery mode of fuel control, the THCMD signal is the lesser of demand input THL or $$TMCMB_C = [THCMD_L * K] + KGR$$

where:
- $THCMD_L$ = the value of the last fuel control command output signal,
- K = a weighting factor having a value greater than unity,
- KGR = a weighting factor dependent upon currently engaged gear ratio, and
- $THCMD_C$ = a calculated maximum value for next fuel control command output signal.

Generally, K has a value of slightly greater than unity, such as about 1.01 to 1.10, to provide a smooth ramping up of THCMD towards THL. KGR has a relatively high value in the lower transmission gear ratios, a relatively low value in the intermediate transmission gear ratios and a relatively high value in the high transmsssion gear ratios. By way of example, in a twelve forward speed transmission, first through fourth gear ratios would be low gear ratios, fifth through eighth gears would be intermediate gear ratios, while ninth through twelfth would be the high gear ratios.

Briefly, in the low gear ratios, a vehicle requires a significant torque to accelerate and relatively rapid increases in fuel supply are unlikely to cause vehicle learching. Similarly, in the high gear ratios the driveline gear reduction is comparatively low and thus relatively rapidly increased fuel to the engine is unlikely to have undesireable effects on the vehicle. However, in the intermediate ratios, the gear reduction is significant and rapidly increased engine fueling, if permitted, is likely to cause torque increases of a magnitude likely to exceed that needed to smoothly accelerate the vehicle resulting in vehicle learching, driveline jolt or the like.

Accordingly, it may be seen that a method of controlling the rate at which control of fueling the engine is returned from the control logic to the vehicle operator is provided which will provide for a smooth but rapid increase of the fuel control command output signal THCMD towards the value of the demand input signal THL. If the value of the demand input signal THL exceeds the value of the command fuel control output signal THCMD, the rate of increasing the command output signal THCMD is dependent upon the currently engaged gear ratio GR and begins from a value dependent upon the then existing engine speed N. Of course, during this recovery mode, the throttle command output THCMD never exceeds the value of the operator demand input signal THL.

Although the AMT system 10 has been described as utilizing a microprocessor based control 42 and the methods and operations carried out as software modes or algorithms, it is clear that the operations can also be carried out in electronic/fluidic logic circuits comprising discrete hardware components.

Clutch operator 30 is preferably controlled by the central processing unit 42 and engages and disengages master clutch 16 generally as described in above-mentioned U.S. Pat. No. 4,081,065. Transmission 12 may include synchronizing means, such as an accelerator and/or a brake mechanism as described in U.S. Pat. No. 3,478,851, hereby incorporated by reference. The transmission 12 is preferably, but not necessarily, of the twin countershaft type as is seen in U.S. Pat. No. 3,105,395, hereby incorporated by reference.

Although the present invettion has been set forth with a certain degree of particularity, it is understood the various modifications are possible without departing from the spirit and scope of the invention a hereinafter claimed.

We claim:

1. A method for controlling a vehicle automatic mechanical transmission system for devices havng an operator actuated throttle pedal, a throttle-controlled engine, a transmission having a plurality of gear ratio combinations selectively engageable between a transmission input shaft and a transmission output shaft, said transmission input shaft being operatively connected to said engine by means of a selectably engageable and disengageable friction coupling, said automatic mechanical transmission system comprising an information processing unit having means for receiving a plurality of input signals including (1) an input signal indicative of the rotational speed of the engine; and (2) an input signal indicative of the operator's setting of the throttle pedal, said processing unit including means for processing said input signals in accordance with a program for generating output signals whereby said transmission system is operated in accordance with said program including a command output signal for control of the engine throttle device, and means associated with said transmission system effective to actuate said transmission system to effect engagement of said gear ratio combinations in response to said output signals from said processing units, said processing unit have a first state in which said command output signals to said engine throttle device generally equal said input signal indicative of operators setting of the throttle pedal, a second state wherein said command output signals to said engine throttle device have a value determined by said processing unit independently of the value of said input signal indicative of operators setting of the throttle pedal and a third state wherein the processing unit is in transition from said second to said first state, the method of operating in said third state characterized by:

sensing the current value of the command output signal to the engine throttle device and the value of the input signal indicative of operators setting of the throttle pedal, if the command output signal to the engine throttle device is greater than or equal to the input signal indicative of throttle pedal position, setting the value of the command signal to the engine throttle device equal to the input signal indicative of throttle pedal position, and if the current value of the command output signal to the engine throttle device is less than the current value of the input signal indicative of throttle pedal, setting the value of the command output signal to the lesser of the current value of the input signal indicative of throttle pedal position and a calculated minimal command output signal value related to current engine speed and thereafter increasing the value of the command output to the engine throttle device until such value equals the then current value of the input signal indicative of throttle pedal position.

2. The method of claim 1, wherein said calculated minimal command output signal value is generally equal to the command output signal value necessary to maintain the vehicle engine at current engine speed under unloaded conditions.

3. The method of claim 2, wherein said processing unit has means for receiving (3) an input signal indicative of currently engaged gear ratio and, wherein said command output signal to the engine throttle device is increased at a rate dependent upon currently engaged gear ratio.

4. The method of claim 3, wherein a maximum updated value of said command output signal to said engine throttle device is calculated according to

THCMD=[THCMD$_L$*K]+KGR where:
THCMD$_L$=value of last command output signal to engine throttle device,
K=a weighting factor having a value greater than one,
KGR=a weighting factor dependent upon currently engaged transmission gear ratio, and
THCMD=maximum updated value of command output signal to engine throttle device.

5. The method of claim 4, wherein the value of the command output signal to the engine throttle device is the lesser of the curent value of the input signal indicative of throttle pedal position and the maximum updated value of the command output signal.

6. The method of claim 4, wherein KGR has a greater value for high and low transmission gear ratios than for intermediate transmission gear ratios.

7. The method of claim 6, wherein the value of the command output signal to the engine throttle device is the lesser of the current value of the input signal indiative of throttle pedal position and the maximum updated alue of the command output signal.

8. The method of claim 1, wherein said processing unit has means for receiving (3) an input signal indicative of currently engaged gear ratio and, wherein said command output signal to the engine throttle device is increased at a rate dependent upon currently engaged gear ratio.

9. The method of claim 8, wherein a maximum updated value of said command output signal to said engine throttle device is calculated according to

THCMD 32 [THCMD$_L$K]+KGR where:
THCMD$_L$=value of last command output signal to engine throttle device,
K=a weighting factor having a value greater than one,
KGR=a weighting factor dependent upon currently engaged transmission gear ratio, and
THCMD=maximum updated value of command output signal to engine throttle device.

10. The method of claim 9, wherein the value of the command output signal to the engine throttle device is the lesser of the current value of the input signal indicative of throttle pedal position and the maximum updated value of the command output signal.

11. The method of claim 9, wherein KGR has a greater value for high and low transmission gear ratios than for intermediate gear ratios.

12. The method of claim 11, wherein the value of the command output signal to the engine throttle device is the lesser of the current value of the input signal indicative of throttle pedal position and the maximum updated value of the command output signal.

13. A method for controlling a vehicle automatic mechanical transmission system for devices having an operator actuated throttle pedal, a throttle-controlled engine, a transmission having a plurality of gear ratio combinations selectively engageable between a transmission input shaft and a transmission output shaft, said transmission input shaft being operatively connected to said engine by means of a selectably engageable and disengageable friction coupling, said automatic mechanical transmission system comprising an information processing unit having means for receiving a plurality of input signals including (1) an input signal indicative of the rotational speed of the engine; (2) an input signal indicative of the operator's setting of the throttle pedal; and (3) an input signal indicative of the currently engaged gear ratio, said processing unit including means for processing said input signals in accordance with a program for generating output signals whereby said transmission system is operated in accordance with said program including a command output signal for control of the engine throttle device, and means associated with said transmission system effective to actuate said transmission system to effect engagement of said gear ratio combinations in response to said output signals from said processing units, said processing unit have a first state in which said command output signals to said engine throttle device generally equal said input signal indicative of operators setting of the throttle pedal, a second state wherein said command output signals to said engine throttle device have a value determined by said processing unit independently of the value of said input signal indicative of operators setting of the throttle pedal and a third state wherein the processing unit is in transition from said second to said first state, the method of operating in said third state characterized by:

sensing the current value of the command output signal to the engine throttle device and the value of the input signal indicative of operators setting of the throttle pedal, if the command output signal to the engine throttle device is greater than or equal to the input signal indicative of throttle pedal position, setting the value of the command signal to the engine throttle device equal to the input signal indicative of throttle pedal position, and if the current value of the command output signal to the engine throttle device is less than the current value of the input signal indicative of throttle pedal, increasing the value of the command output signal to the engine throttle device at a rate dependent upon currently engaged gear ratio until such value equals the then current value of the input signal indicative of throttle pedal position.

14. The method of claim 13, wherein a maximum updated value of said command output signal to said engine throttle device is calculated according to

THCMD=[THCMD$_L$*K]+KGR

Where:
THCMD$_L$=value of last command output signal to engine throttle device,
K=a weighting factor having a value greater than one, KGR = a weighting factor dependent upon currently engaged transmission gear ratio, and THCMD = maximum updated value of command output signal to engine throttle device.

15. The method of claim 14, wherein the value of the command output signal to the engine throttle device is the lesser of the current value of the input signal indicative of throttle pedal position and the maximum updated value of the command output signal.

16. The method of claim 14, wherein KGR has a greater value for high and low transmission gear ratios than for intermediate transmission gear ratios.

17. The method of claim 16, wherein the value of the command output signal to the engine throttle device is the lesser of the current value of the input signal indicative of throttle pedal position and the maximum updated value of the command output signal.

* * * * *